United States Patent
Cheng et al.

(10) Patent No.: US 9,628,233 B2
(45) Date of Patent: Apr. 18, 2017

(54) METHOD OF REFERENCE SIGNAL ALLOCATION IN WIRELESS COMMUNICATION SYSTEMS

(75) Inventors: Shan Cheng, Suwon-si (KR); Sung Tae Kim, Suwon-si (KR); Jin Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 1119 days.

(21) Appl. No.: 12/871,360

(22) Filed: Aug. 30, 2010

(65) Prior Publication Data
US 2011/0051749 A1 Mar. 3, 2011

(30) Foreign Application Priority Data
Aug. 28, 2009 (KR) .................. 10-2009-0080363

(51) Int. Cl.
*H04W 64/00* (2009.01)
*H04L 5/00* (2006.01)

(52) U.S. Cl.
CPC .................. *H04L 5/0048* (2013.01)

(58) Field of Classification Search
CPC .................................................. H04L 5/0048
USPC .............. 370/480, 491, 330, 343, 208, 344; 455/450; 375/260
See application file for complete search history.

(56) References Cited

U.S. PATENT DOCUMENTS

| | | | | |
|---|---|---|---|---|
| 7,619,963 B2 * | 11/2009 | Abe et al. | ...................... | 370/208 |
| 8,254,329 B2 * | 8/2012 | Ko et al. | ...................... | 370/330 |
| 2006/0126491 A1 * | 6/2006 | Ro et al. | ...................... | 370/208 |
| 2007/0140104 A1 * | 6/2007 | Lim et al. | ..................... | 370/208 |
| 2009/0011767 A1 * | 1/2009 | Malladi et al. | ............... | 455/450 |

FOREIGN PATENT DOCUMENTS

KR 1020080054164 6/2008

OTHER PUBLICATIONS

Christina Gessner et al., "LTE Technology and LTE Test; A Deskside Chat", Rohde&Schwarz, Apr. 2009.
Korean Office Action dated Oct. 23, 2015 issued in counterpart application No. 10-2009-0080363, 7 pages.

* cited by examiner

*Primary Examiner* — Jamal Javaid
(74) *Attorney, Agent, or Firm* — The Farrell Law Firm, P.C.

(57) ABSTRACT

A method is provided for determining reference signal positions in a frequency-time domain in an Orthogonal Frequency Division Multiple Access (OFDMA) system. A plurality of sub-carriers are selected in one resource block according to a predetermined mother pattern for reference signal allocation. When a single resource block is assigned for transmission to a user, the reference signal positions are determined corresponding to the plurality of selected sub-carriers in the single resource block. When multiple resource blocks are assigned for transmission to a user, the reference signal positions are determined in the multiple resource blocks by reducing a number of the plurality of selected sub-carriers in the mother pattern for at least one of the multiple resource blocks.

8 Claims, 5 Drawing Sheets

(a)

(b)

(c)

(d)

(a)  (b)

US 9,628,233 B2

METHOD OF REFERENCE SIGNAL ALLOCATION IN WIRELESS COMMUNICATION SYSTEMS

PRIORITY

This application claims priority under 35 U.S.C. §119(a) to a Korean patent application filed on Aug. 28, 2009 in the Korean Intellectual Property Office and assigned Serial No. 10-2009-0080363, the entire disclosure of which is incorporated herein by reference.

BACKGROUND OF THE INVENTION

1. Field of the Invention

The present invention relates generally to a wireless cellular communication system, and more particularly, to an Orthogonal Frequency Division Multiplexing (OFDM) wireless communication system in which resource allocation is made on per resource block basis.

2. Description of the Related Art

FIG. 1 illustrates a reference signal pattern defined in 3GPP LTE Release 8, where Reference Elements (REs) 0-3 are Cell-specific Reference Signals (CRS) for antenna ports 0-3, respectively. REs 5 are for User Equipment (UE)-specific Demodulation Reference Signals (DMRS) indicated as virtual port 5.

The CRS uses common reference sequences known to all UEs, while the DMRS is precoded according the antenna weights applied to corresponding data payloads.

Regular Reference Signal (RS)-RE distribution for simpler channel estimator design preferably includes uniform spacing of RS-REs.

Identical RS-RE distribution for multiple Resource Blocks (RBs) is also preferable for both simpler transmitter and receiver designs.

Joint RS decoding is performed across contiguous RBs for improved estimation performance. The channel estimation performance can be significantly improved by basing on more neighboring RS-REs. RS-RE placement at or near the edge of RB allocation allows for better interpolation. Channel estimation by extrapolation is worse than that using interpolation. Thus, RS-RE placement at the edge of resource allocation is preferable, especially in the frequency domain.

However, since it is difficult to meet all the above requirements, a good tradeoff/compromise must be made among them.

FIG. 2 illustrates DMRS designs for one RB. P1-P2 are DMRS patterns for one-layer transmission. In total, 12 REs are dedicated for DMRS purpose. In P1, RS-REs are connected to one another in the frequency domain, while in P2, RS-REs are connected to one another in the time domain. RS-REs are placed at the RB edge for better channel estimation performance.

P3-P5 are DMRS patterns for two-layer transmission. In total, 12 REs are dedicated for DMRS purpose. In P3 and P4, RS-REs are divided for layer one and layer two transmission based on P1 and P2, respectively. In P4, the layer-one and layer-two transmissions reuse the same RS-REs, and orthogonal codes are applied to each layer (Code Division Multiplexing (CDM)).

P6-P8 are DMRS patterns for four-layer transmission. In total 24, REs are dedicated for DMRS purpose. In P6, 24 RS-REs are divided so that each layer occupies 6 REs. In P7 and P8, the layer-one and layer-two transmissions reuse the same RS-REs, while the layer-one and layer-two transmissions reuse another set of RS-REs.

P9 DMRS patterns are designed for multi-layer transmission up to eight layers. All the layers reuse the same 24 REs, and orthogonal cover codes are applied to distinguish one layer from another.

All P1-P9 designs attempt to place RS-REs at the frequency edge of an RB. This is preferable when there is only one stand-alone RB allocation for a UE. However, when the resource allocation to a certain UE is contiguous, i.e., multiple contiguous RBs across the frequency domain are assigned to the UE, those one-RB-optimized RS patterns may no longer be preferable. FIG. 3 illustrates an example by concatenating multiple RBs with P7 design. RS-REs aggregate at the border of two RBs. However, this is not an efficient design, since RSs that are close to each other may not provide a significant amount of gain comparing when compared to a design with uniform RS spacing given the same overall RS density.

SUMMARY OF THE INVENTION

The present invention has been made to address the above problems and/or disadvantages and to provide at least the advantages described below. Accordingly, an aspect of the present invention provides a method of reference signal allocation in wireless communication systems.

Another aspect of the present invention provides a method for generating per resource based RS patterns, which are optimized for both non-contiguous and contiguous RB allocations.

According to one aspect of the present invention, a method is provided for determining reference signal positions in a frequency-time domain in an Orthogonal Frequency Division Multiple Access (OFDMA) system. A plurality of sub-carriers are selected in one resource block according to a predetermined mother pattern for reference signal allocation. When a single resource block is assigned for transmission to a user, the reference signal positions are determined corresponding to the plurality of selected sub-carriers in the single resource block. When multiple resource blocks are assigned for transmission to a user, the reference signal positions are determined in the multiple resource blocks by reducing a number of the plurality of selected sub-carriers in the mother pattern for at least one of the multiple resource blocks.

According to another aspect of the present invention, a method is provided for determining reference signal positions in a frequency-time domain in an OFDMA system. A plurality of reference signal patterns are defined for one resource block. Each pattern contains a plurality of sub-carriers for reference signal allocation in the resource block. When a plurality of resource blocks are assigned for transmission to a user, the reference signal positions are determined using one of the plurality of reference signal patterns for each of the plurality of resource blocks allocated to the user according to relative location in the frequency-time domain of each of the plurality of resource blocks within the plurality of resource blocks.

According to an additional aspect of the present invention, a method is provided for determining reference signal positions in a frequency-time domain in an OFDMA system. A number of resource blocks are generated that are assigned for transmission to a user to input a predefined function. The reference signal positions corresponding to a plurality of sub-carriers are determined for reference signal allocation in the resource blocks according to the predefined function.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
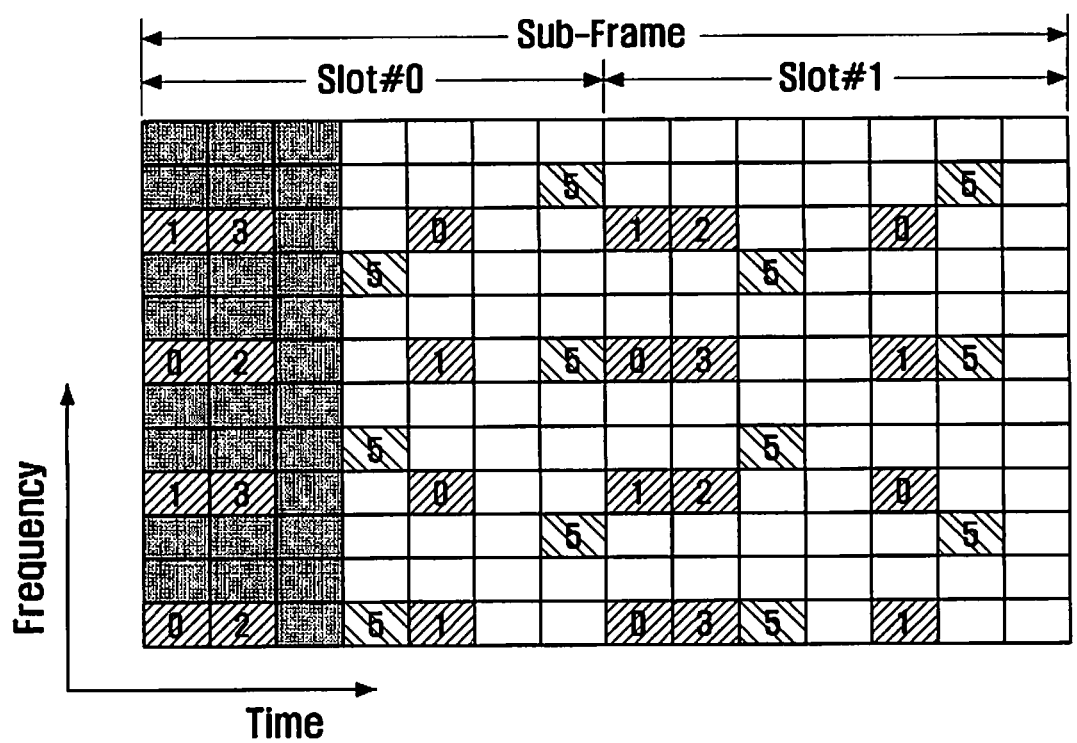
FIG. 1 illustrates an existing RS pattern in 3GPP Rel8.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used by the inventor to enable a clear and consistent understanding of the invention.

An RB is configured as a plurality of sub-carriers/REs across a plurality of OFDM symbols. The plurality of sub-carrier can be contiguous or non-contiguous in the frequency domain, and the plurality of OFDM symbols can also be contiguous or non-contiguous in the time domain. In embodiments of the present invention, without losing generality, it is assumed that a RB consists of a plurality of contiguous sub-carriers across a plurality of contiguous OFDM symbols for simplicity. The method provided by embodiments of the present invention can be easily generalized to non-contiguous cases.

Throughout the present invention, the $3^{rd}$ Generation Partnership Project (3GPP) Long Term Evolution (LTE) Release 8 is regarded as the legacy system and the in-development Release 10 system is a system where embodiments of the present invention can be implemented. The current invention can also be applied to other cellular systems such as IEEE 802.16 (Worldwide Interoperability for Microwave Access (WiMax)).

The embodiments of the present invention focus on a scenario when multiple RBs are allocated to one UE in an OFDMA communication system.

There are several ways of generating the aforementioned RS patterns. First, the one-RB-based RS pattern is repeated for contiguous RB allocation. The redundant/unnecessary RS-REs are punctured at the RB edges and saved for data transmission. Layer switching can also be applied to those RS-REs if necessary.

Secondly, multiple one-RB-based RS patterns are designed for contiguous RB allocation. For example, four patterns, namely, a stand-alone pattern, an upper-edge pattern, a middle pattern and a lower-edge pattern, are designed, and a different pattern is used according to the location of a particular RB among the RB allocation.

Finally, the RB position is calculated from a given equation. The location of a particular RB among the RB allocation is an input of the equation.

The above RS pattern generation methods are merely ways to generate the desirable RS pattern for contiguous RB allocation. The result of these three methods can be identical to each other.

An OFDMA system partitions the available resources into resource blocks and each resource block consists of a plurality of sub-carriers in both a frequency and time domain. A plurality of resource blocks are allocated to a particular user for each of the transmission layers. The plurality of resource blocks are further partitioned into a plurality of groups. The at least three methods for determining reference signal positions in a frequency-time domain in the OFDMA system are described as a plurality of embodiments of the present invention.

The first method uses the pattern by concatenating conventional RS patterns across contiguous RBs as the mother pattern, and punctures out some of the RS-REs using a certain rule.

Figure 2:
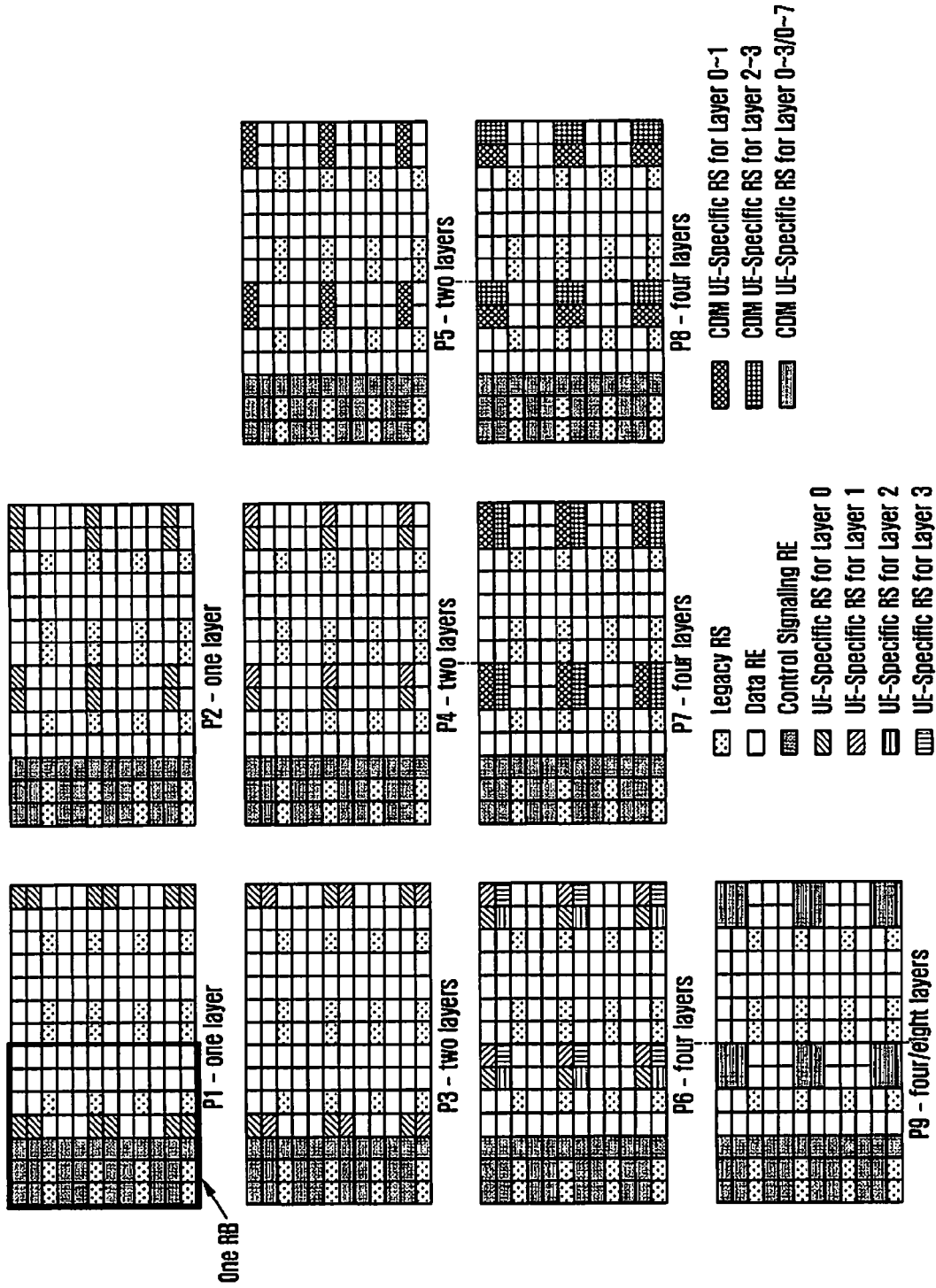
FIG. 2 illustrates an existing per RB based RS design.
Figure 3:
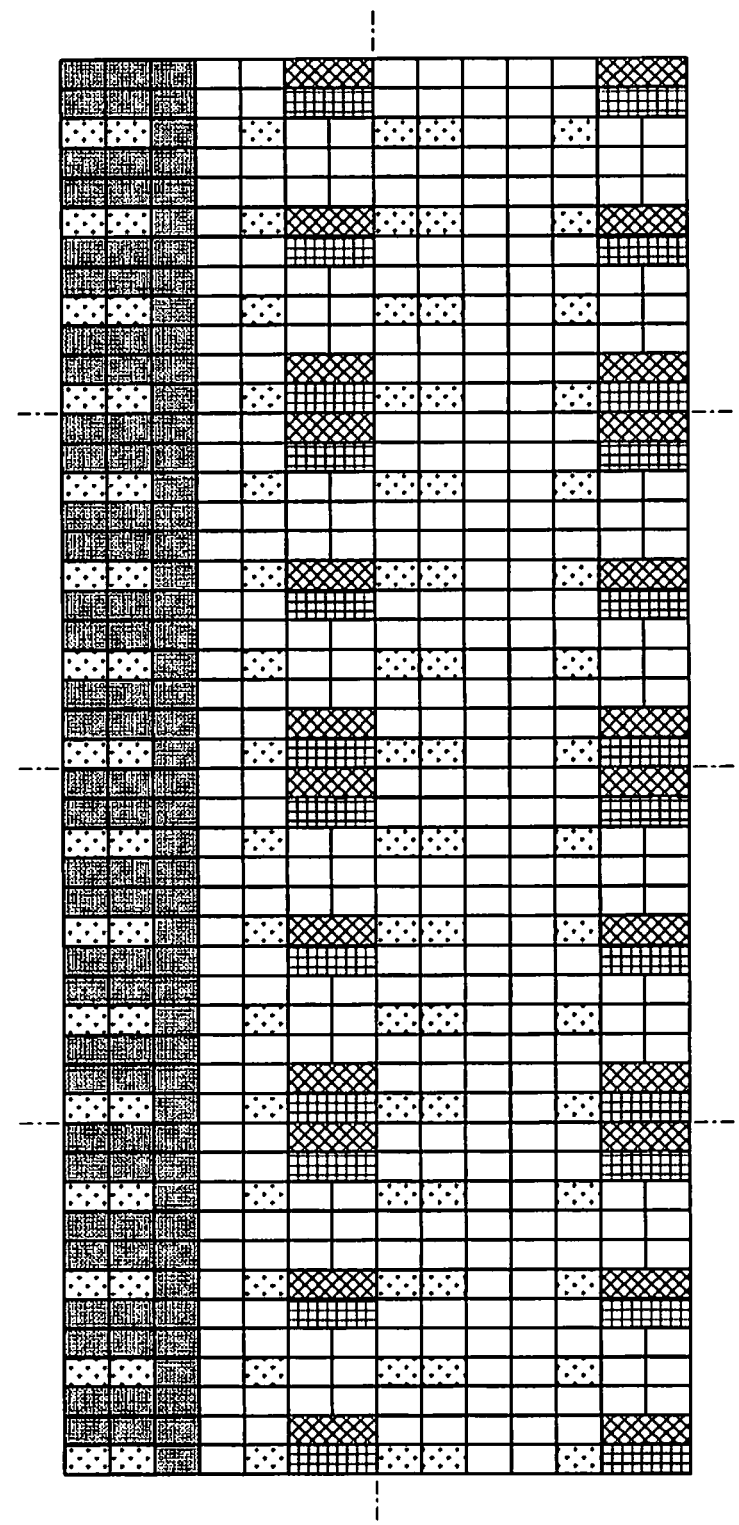
FIG. 3 illustrates the RS pattern for contiguous RBs with a conventional P7 design.

Using P7 in FIG. 2 as an example, the mother pattern is shown in FIG. 3 with four contiguous RBs across the frequency domain.

FIG. 3 illustrates that the RS-REs are aggregated at the edges of RBs. This is undesirable because it makes the RS distribution for one layer irregular along the frequency domain, and thus, incurs more complexity for the channel estimator. This is also undesirable because the RSs that are close to each other may have significant performance gain when compared to uniformly spaced RSs having the same overall RS density.

In an embodiment of the present invention, RS-RE is punctured at the RB edges so that they can be distributed much more evenly. By puncturing the RS-REs, more REs can be saved for data transmission.

Figure 4:
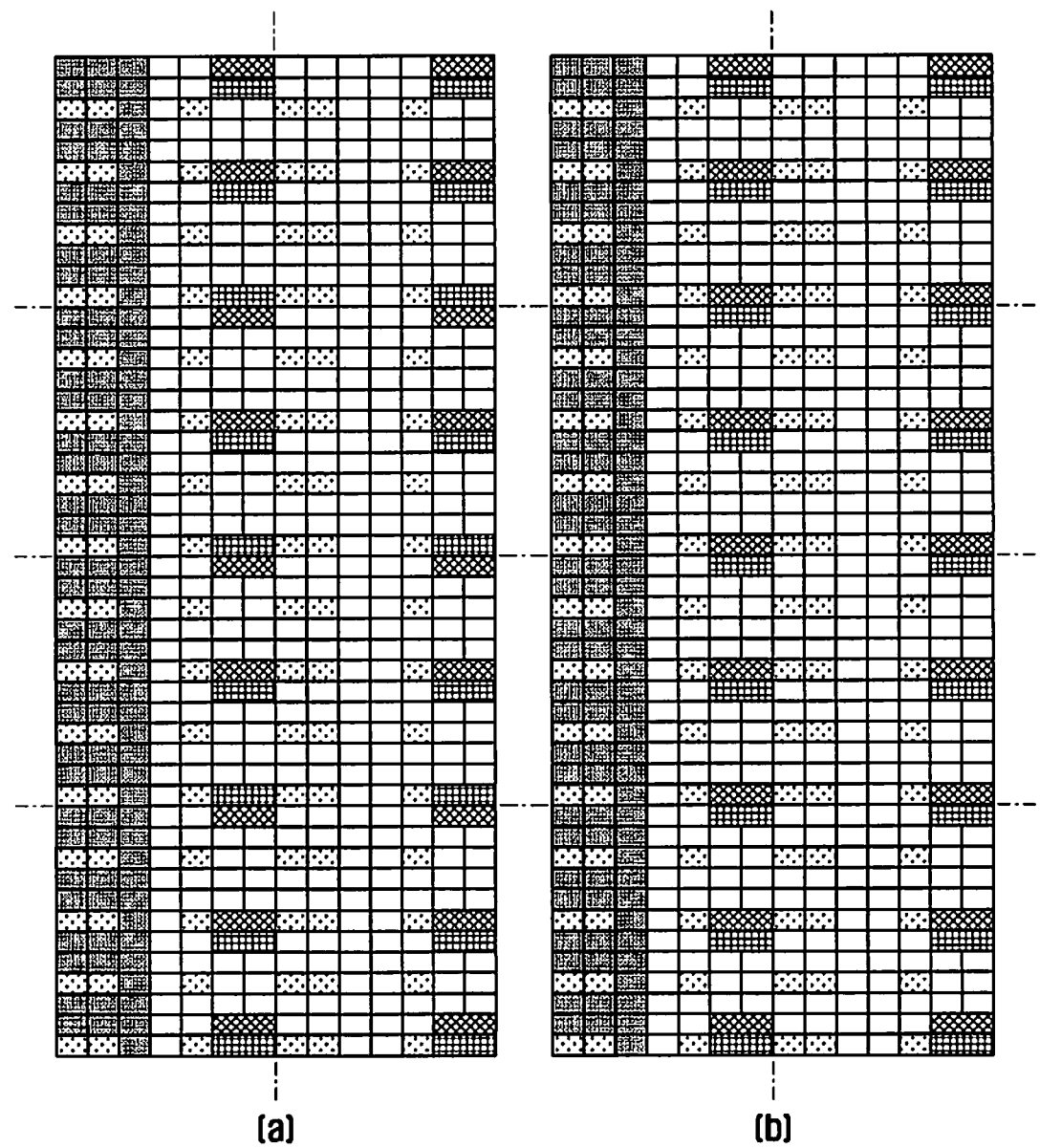
FIGS. 4(a) and (b) illustrate RS patterns based on P7 design, according to an embodiment of the present invention.

FIG. 4(a) illustrates a pattern created by direct puncturing of the RS-REs in FIG. 3, according to a first embodiment of the present invention. When compared to FIG. 3, a total of 24 REs are punctured and transformed into data REs for the four contiguous RBs. The light-grey REs are those new data REs punctured from RS-REs.

Though improved, the pattern in FIG. 4(a) still provides irregular spacing for each layer across the frequency domain. In FIG. 4(b) the RS layers are swapped for those RB-edge RSs, according to a second embodiment of the present invention, so that a more uniform spacing can be achieved. In FIG. 4(b), uniform distribution can be obtained for the middle part of the contiguous RB allocation. However, the spacing might become different for the upper-most and lower-most edge based on RB size and RS density as shown in FIG. 4(b).

In order to generate a desired RS pattern optimized for contiguous RB allocation, the system can define multiple per RB based patterns, and select one defined pattern for a particular RB based on the RB's location among the RB allocation.

Figure 5:
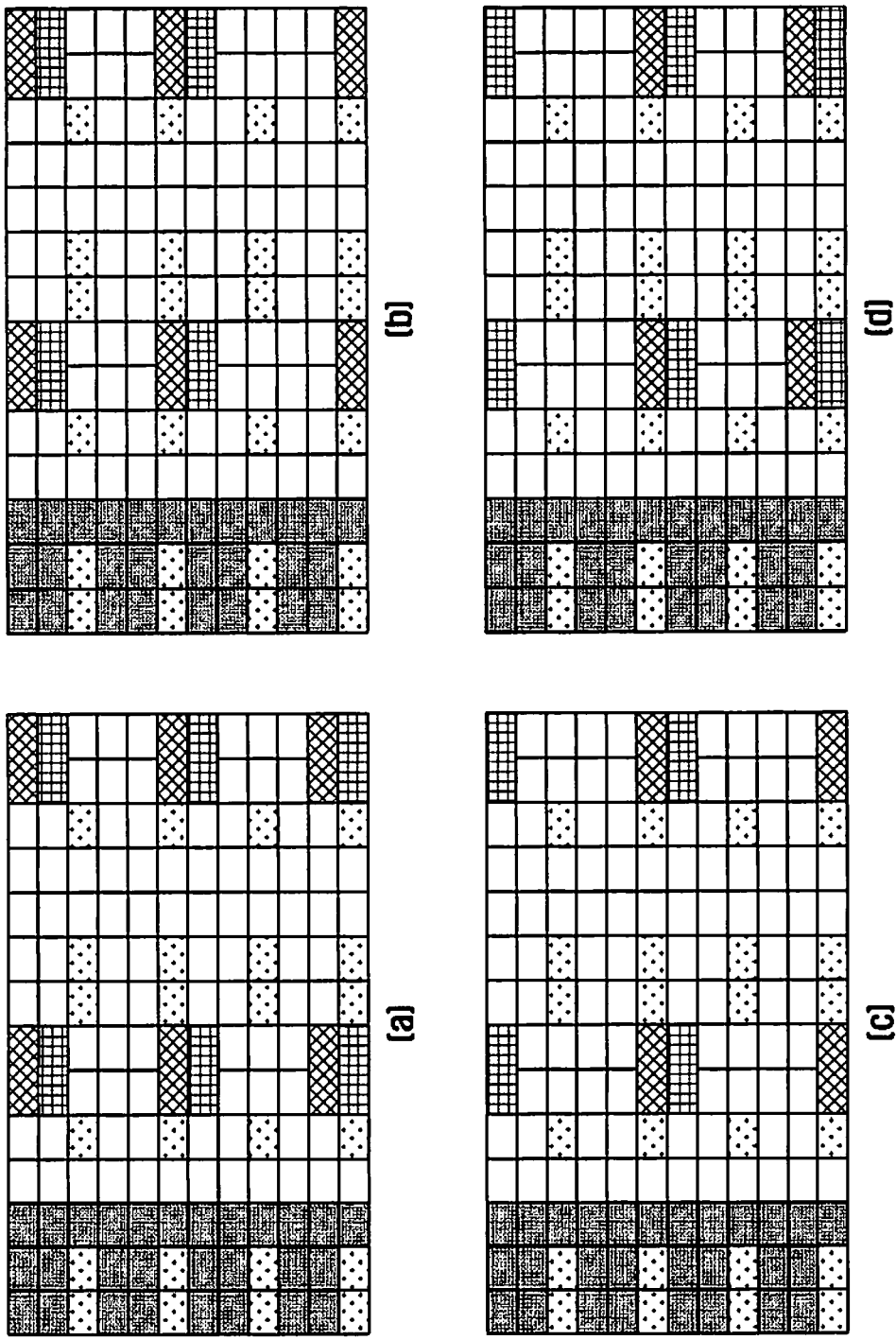
FIGS. 5(a)-(d) illustrate per RB based RS patterns for RS generation, according to an embodiment of the present invention.

FIG. 5 illustrates a multiple-pattern approach for four-layer design, according to a third embodiment of the present invention. Four patterns are predefined, namely, a stand-alone pattern, an upper-edge pattern, a middle pattern and a lower-edge pattern. The four patterns are shown in sub-figures (a)-(d), respectively.

The system generates the RS pattern by the RB location in the contiguous RB allocation. If the RB is a stand-alone allocation for the UE, pattern (a) is applied. If the RB is the upper-most RB in the allocation, pattern (b) is applied. If the RB is a middle RB in the allocation, pattern (c) is applied. If the RB is the lower-most RB in the allocation, pattern (d) is applied. A number of different patterns can be designed based on different criteria.

The RS pattern can also be generated by a predefined equation, where the total number of RBs of the resource allocation is one of the input parameters.

Assuming that there are $N_{CRB}$ contiguous RB allocated to an UE, and that each RB consists of $S_{RB}$ carriers across, the RS pattern can be generated using Equations (1) and (2) below.

$$n_{RS} = \{1, N_{CRB}, m*\text{RS\_Spacing} + \text{RS\_offset}\} \quad (1)$$

$$m = 1, 2, \ldots \text{floor}[(N_{CRB}*S_{RB}-2)/\text{RS\_Spacing}] \quad (2)$$

where $n_{RS}$ denotes the position of each reference signal, $N_{CRB}$ denotes the number of resource blocks, RS_Spacing denotes a space between the two reference signals, $S_{RB}$ denotes a number of sub-carriers in each resource block, and RS_offset denotes an offset value in each resource block.

For the allocated RBs, the $n_{RS}$-th carrier of the designated OFDM symbols are allocated as RS-REs.

For the RS pattern illustrated in FIG. 4(b), $N_{CRB}=4$, $S_{RB}=12$, RS_Spacing=6, RS_offset=2 for layers 0-1, and RS_offset=3 for layers 2-3. The resultant RS pattern is dependent on the number of contiguous RBs. Specifically, the total number of REs allocated as RSs is not strictly proportional to the number of allocated RBs. Thus, the power allocation of RS-REs becomes an issue.

When compared to the conventional designs of FIG. 2, the embodiments of the present invention reduce the number of total RS-REs and saves them for data transmission purposes.

If there is no RS power boosting between RS and data REs, less energy is allocated to the RS and channel estimation degradation will be expected. However, more REs, or more energy, are allocated to data. The data coding rate can be reduced to compensate the channel estimation degradation while achieving the same system throughput. Alternatively, the data coding rate can be maintained and the system throughput can be improved. However, the improved throughput may be degraded due to the channel estimation degradation.

If the energy allocated to RS and data is to be fixed, more energy would be allocated to RS-REs compared to data REs, since the number of RS-REs is reduced in the embodiments of the present invention as compared to conventional designs.

Since the actual ratio of RS-REs varies according to the number of contiguous RBs, the system needs to calculate the RS and data power allocation based on the number of contiguous RBs. This introduces more complexity to the system.

When RS power boosting is applied, no channel estimation degradation will be expected as compared to conventional approaches. The per RE power of data is slightly reduced. However, it would be compensated by having more data REs and robust coding schemes.

In a wireless communication system, RB bundling can be applied. In RB bundling, the assigned RBs are divided into contiguous RB groups, the same precoding is applied to each group, and the precoding may vary from group to group. The number of RBs in an RB group is preconfigured. When RB bundling is applied, the terminal will generate an RS pattern for each group, based on any of the aforementioned methods.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of determining reference signal positions in a frequency-time domain in an Orthogonal Frequency Division Multiple Access (OFDMA) system, the method comprising the steps of:
   selecting, by a terminal of the OFDMA system, a plurality of sub-carriers in one resource block according to a predetermined mother pattern for reference signal allocation;
   when a single resource block is assigned for transmission to a user, determining the reference signal positions corresponding to the plurality of selected sub-carriers in the single resource block, by the terminal of the OFDMA system; and
   when multiple resource blocks are assigned for transmission to a user, determining, by the terminal of the OFDMA system, the reference signal positions in the multiple resource blocks corresponding to the mother pattern, wherein the mother pattern of at least one of the multiple resource blocks has a reduced number of the plurality of selected sub-carriers disposed near an edge of the at least one of the multiple resource blocks.

2. The method of claim 1, wherein allocated powers for the plurality of sub-carriers corresponding to the determined reference signal positions are not changed when the multiple resource blocks are assigned for transmission to the user.

3. The method of claim 1, wherein allocated powers for the plurality of sub-carriers corresponding to the determined reference signal positions are changed when the multiple resource blocks are assigned for transmission to the user.

4. The method of claim 1, wherein determining the reference signal positions in the multiple resource blocks comprises switching the reference signal positions for at least two of a plurality of transmission layers.

5. A method of determining reference signal positions in a frequency-time domain in an Orthogonal Frequency Division Multiple Access (OFDMA) system, the method comprising the steps of:
   selecting, by a base station of the OFDMA system, a plurality of sub-carriers in one resource block according to a predetermined mother pattern for reference signal allocation;
   when a single resource block is assigned for transmission to a user, determining the reference signal positions corresponding to the plurality of selected sub-carriers in the single resource block, by the base station of the OFDMA system; and
   when multiple resource blocks are assigned for transmission to a user, determining, by the base station of the OFDMA system, the reference signal positions in the multiple resource blocks corresponding to the mother pattern, wherein the mother pattern of at least one of the multiple resource blocks has a reduced number of the plurality of selected sub-carriers disposed near an edge of the at least one of the multiple resource blocks.

6. The method of claim 5, wherein allocated powers for the plurality of sub-carriers corresponding to the determined reference signal positions are not changed when the multiple resource blocks are assigned for transmission to the user.

7. The method of claim 5, wherein allocated powers for the plurality of sub-carriers corresponding to the determined reference signal positions are changed when the multiple resource blocks are assigned for transmission to the user.

8. The method of claim 5, wherein determining the reference signal positions in the multiple resource blocks comprises switching the reference signal positions for at least two of a plurality of transmission layers.

* * * * *